(12) United States Patent
Ikeda et al.

(10) Patent No.: US 9,394,647 B2
(45) Date of Patent: Jul. 19, 2016

(54) ADHESIVE COMPOSITION FOR ORGANIC FIBER CORDS, RUBBER-REINFORCING MATERIAL USING SAME, TIRE AND BONDING METHOD

(75) Inventors: Yuji Ikeda, Kodaira (JP); Emil Giza, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 759 days.

(21) Appl. No.: 13/266,367

(22) PCT Filed: Apr. 26, 2010

(86) PCT No.: PCT/JP2010/057332
§ 371 (c)(1),
(2), (4) Date: Oct. 26, 2011

(87) PCT Pub. No.: WO2010/125992
PCT Pub. Date: Nov. 4, 2010

(65) Prior Publication Data
US 2012/0041113 A1 Feb. 16, 2012

(30) Foreign Application Priority Data
Apr. 28, 2009 (JP) ................. 2009-109891

(51) Int. Cl.
| | | |
|---|---|---|
| *C08K 5/15* | (2006.01) | |
| *D04H 13/00* | (2006.01) | |
| *D06M 15/693* | (2006.01) | |
| *C08G 18/58* | (2006.01) | |
| *C08J 5/06* | (2006.01) | |
| *C09J 5/00* | (2006.01) | |
| *C09J 109/08* | (2006.01) | |
| *C09J 175/04* | (2006.01) | |
| *D06M 13/11* | (2006.01) | |
| *D06M 13/325* | (2006.01) | |
| *D06M 13/395* | (2006.01) | |
| *C08K 5/1515* | (2006.01) | |
| *C08K 5/29* | (2006.01) | |
| *C08L 77/02* | (2006.01) | |
| *D06M 101/32* | (2006.01) | |
| *D06M 101/34* | (2006.01) | |

(52) U.S. Cl.
CPC ............. *D06M 15/693* (2013.01); *C08G 18/58* (2013.01); *C08J 5/06* (2013.01); *C09J 5/00* (2013.01); *C09J 109/08* (2013.01); *C09J 175/04* (2013.01); *D06M 13/11* (2013.01); *D06M 13/325* (2013.01); *D06M 13/395* (2013.01); *C08J 2321/00* (2013.01); *C08K 5/1515* (2013.01); *C08K 5/29* (2013.01); *C08L 77/02* (2013.01); *C08L 2205/16* (2013.01); *C09J 2400/263* (2013.01); *C09J 2421/00* (2013.01); *C09J 2463/00* (2013.01); *C09J 2467/006* (2013.01); *C09J 2477/006* (2013.01); *D06M 2101/32* (2013.01); *D06M 2101/34* (2013.01)

(58) Field of Classification Search
CPC ..... C09J 109/08; C08G 18/58; D06M 15/693
USPC .................. 524/114, 156; 428/378; 156/148
See application file for complete search history.

(56) References Cited

U.S. PATENT DOCUMENTS

| | | | | |
|---|---|---|---|---|
| 4,680,228 A | * | 7/1987 | Sharma | ........................ 428/378 |
| 5,232,972 A | | 8/1993 | Sasaki et al. | |

FOREIGN PATENT DOCUMENTS

| | | |
|---|---|---|
| CN | 1733824 A | 2/2006 |
| CN | 1981083 A | 6/2007 |
| CN | 101296974 A | 10/2008 |
| CN | 102007171 A | 4/2011 |
| GB | 1271883 | 4/1972 |
| JP | 58-002370 A | 1/1983 |
| JP | 60-092371 A | 5/1985 |
| JP | 60-096674 A | 5/1985 |
| JP | 63-061433 A | 3/1988 |
| JP | S63-249784 A | 10/1988 |
| JP | 03-163181 A | 7/1991 |
| JP | 2006-037251 A | 2/2006 |
| JP | 2007-169833 A | 7/2007 |
| JP | 2008-169504 A | 7/2008 |
| WO | WO 2007/072703 A1 | 6/2007 |

OTHER PUBLICATIONS

Machine translation of JP2008-169504, Takao, et. al., Jul. 24,008.*
Office Action dated Jun. 5, 2013 from the People's Republic of China Patent Office in a counterpart Chinese Application No. 201080019100.9.
Office Action dated Oct. 10, 2012 from the People Republic of China in a counterpart Chinese Application No. 201080019100.9.
Communication dated Dec. 4, 2014 from the European Patent Office in counterpart European Application No. 10769690.8.

* cited by examiner

*Primary Examiner* — Aiqun Li
(74) *Attorney, Agent, or Firm* — Sughrue Mion, PLLC

(57) ABSTRACT

Provided is an adhesive composition for organic fiber cords which does not contain resorcinol and formaldehyde and has a good adhesive property and is good for the environment, particularly for the work environment, and a rubber reinforcing material, a tire and a bonding method using the same. Also provided is an adhesive composition for organic fiber cords which contains (blocked) isocyanate compound and/or amine-based curing agent (A), epoxy compound (B), rubber latex (C), and a rubber reinforcing material, a tire and a bonding method using the same. The ratio of the mass of the (blocked) isocyanate compound and/or amine curing agent (A) a to the mass of the epoxy compound (B) b (the mass of (blocked) isocyanate compound and/or amine curing agent/ the mass of epoxy compound), a/b is preferably not smaller than 0.1 and not larger than 30.

7 Claims, No Drawings

ADHESIVE COMPOSITION FOR ORGANIC FIBER CORDS, RUBBER-REINFORCING MATERIAL USING SAME, TIRE AND BONDING METHOD

TECHNICAL FIELD

The present invention relates to an adhesive composition for organic fiber cords (hereinafter, also simply referred to as "an adhesive composition"), and a rubber reinforcing material, a tire and a bonding method using the same, and particularly relates to an adhesive composition for organic fiber cords which does not contain resorcinol and formaldehyde and has a good adhesive property and is good for the environment, particularly for the work environment, and a rubber reinforcing material, a tire and a bonding method using the same.

BACKGROUND ART

Conventionally, it is known that RFL (resorcinol-formaldehyde-latex) adhesive which contains resorcinol, formaldehyde and rubber latex is used for bonding tire cords constituted of polyester fiber or the like and rubber for a tire, and that the adhesive strength is secured by heat curing (see Patent Documents 1 to 3).

It is also known that the adhesive strength is further improved by using a resorcinol-formaldehyde resin which is formed by condensing resorcinol and formaldehyde (see Patent Documents 4 and 5), or pretreating with epoxy resin.

RELATED ART DOCUMENTS

Patent Documents

Patent Document 1: Japanese Unexamined Patent Application Publication No. Sho 58-2370 (claims or the like)
Patent Document 2: Japanese Unexamined Patent Application Publication No. Sho 60-92371 (claims or the like)
Patent Document 3: Japanese Unexamined Patent Application Publication No. Sho 60-96674 (claims or the like)
Patent Document 4: Japanese Unexamined Patent Application Publication No. Sho 63-249784 (claims or the like)
Patent Document 5: Japanese Examined Patent Application Publication No. Sho 63-61433 (claims or the like)

SUMMARY OF INVENTION

Problems to be Solved by the Invention

However, since although formaldehyde is an important raw material to crosslink resorcinol, it is suspected to be carcinogenetic, in consideration of the environment, in particular the work environment, it is required that the release thereof into atmosphere be inhibited and the amount thereof used be reduced. Since resorcinol is also suspected to be an endocrine disrupting chemical, the amount thereof used is required to be reduced.

Accordingly, an object of the present invention is to provide an adhesive composition for organic fiber cords which does not contain resorcinol and formaldehyde and has a good adhesive property and is good for the environment, particularly for the work environment, and a rubber reinforcing material, a tire and a bonding method using the same.

Means for Solving the Problems

In order to solve the above problems, the present inventors intensively studied to find that the above problems can be solved by using an adhesive composition for organic fiber cords having a specific composition which does not contain resorcinol and formaldehyde, thereby completing the invention.

More specifically, the adhesive composition for organic fiber cords according to the present invention is characterized in that the adhesive composition contains a (blocked) isocyanate compound and/or an amine-based curing agent (A), an epoxy compound (B) and rubber latex (C).

In the adhesive composition for organic fiber cords according to the present invention, the ratio of the mass of the (blocked) isocyanate compound and/or the amine-based curing agent (A) a to the mass of the epoxy compound (B) b, a/b is preferably not smaller than 0.1 and not larger than 30. Further, the ratio of the total mass of the epoxy compound (B) and the (blocked) isocyanate compound and/or the amine-based curing agent (A) b+a to the mass of the rubber latex (C) c, (b+a)/c is preferably not smaller than 0.1 and not larger than 1.0.

Still further, in the adhesive composition for organic fiber cords according to the present invention, the rubber latex (C) is preferably constituted of vinylpyridine-styrene-butadiene copolymer latex. Still further, the vinylpyridine-styrene-butadiene copolymer latex is preferably constituted of vinylpyridine-styrene-butadiene copolymer latex having a double structure which can be obtained by (i) polymerizing a monomer mixture having a styrene content of 30 to 60% by mass, a butadiene content of less than 60% by mass and a vinylpyridine content of 0.5 to 15% by mass, (ii) then, polymerizing a monomer mixture having a styrene content of 10 to 40% by mass, a butadiene content of 45 to 75% by mass and a vinylpyridine content of 5 to 20% by mass, at a lower styrene content than that used in the polymerization in the item (i).

The bonding method according to the present invention is characterized in that an adhesive layer is formed by covering an organic fiber cord for tire reinforcement formed by twisting organic fibers with the adhesive composition for organic fiber cords according to the present invention, and the organic fiber cords and rubber are bonded via the adhesive composition for organic fiber cords.

In the bonding method of the present invention, the organic fiber cords is preferably immersed in the adhesive composition for organic fiber cords to form the adhesive layer. Further, it is preferable that the adhesive layer be formed on the surface of the organic fiber cords, and then, the organic fiber cords be subjected to a drying process and a heating process, and further, the organic fiber cords be embedded in non-vulcanized rubber and the non-vulcanized rubber be subjected to a vulcanization process to bond the organic fiber cords and rubber via the adhesive composition for organic fiber cords. Still further, for the organic fiber cords, those constituted of polyester or nylon are preferably used.

The rubber reinforcing material according to the present invention constituted of organic fiber cords for tire reinforcement formed by twisting organic fibers and rubber which covers the organic fiber cords is characterized in that the organic fiber cord and the rubber are bonded by using the adhesive composition for organic fiber cords according to the present invention.

In the rubber reinforcing material of the present invention, the organic fiber cords is preferably constituted of polyester or nylon.

The tire according to the present invention is characterized in that the rubber reinforcing material according to the present invention is used.

Effects of the Invention

According to the present invention, by employing the above constitution, it becomes possible to provide an adhesive composition for organic fiber cords which does not contain resorcinol and formaldehyde and has a good adhesive property and is good for the environment, particularly for the work environment, and a rubber reinforcing material, a tire and a bonding method using the same.

MODES FOR CARRYING OUT THE INVENTION

Preferred embodiments of the present invention will be described specifically with reference to the drawings.

The adhesive composition for organic fiber cords according to the present invention contains (blocked) isocyanate compound and/or amine-based curing agent (A), epoxy compound (B) and rubber latex (C). By this, either an equaling or surpassing adhesive strength can be obtained in one bath without substantially using resorcinol and formaldehyde in the process of bonding organic fiber cords and rubber. The adhesive composition according to the present invention can be used without pretreating with epoxy resin even when applied to an organic fiber cord which is hard to be bonded such as polyester resins or aramid resins. When the adhesive composition for organic fiber cords according to the present invention does not contain epoxy compound (B), the absorption of the adhesive composition on the surface of the organic fiber cord becomes insufficient, and the adhesive property between organic fiber cords and the adhesive composition decreases. A (blocked) isocyanate compound has an effect of improving the crosslink density of the adhesive composition, and when the adhesive composition according to the present invention does not contain the (blocked) isocyanate compound, the strength of the adhesive composition decreases and the adhesive property again decreases. On the other hand, the amine-based curing agent has en effect of accelerating the curing speed of the epoxy compound, and by this, the adhesive property between the organic fiber cords and the adhesive composition can be improved.

The (blocked) isocyanate compound used for the adhesive composition for organic fiber cords according to the present invention can be obtained by the addition reaction between the isocyanate group of an organic polyisocyanate compound and a known blocking agent. Here, examples of the organic polyisocyanate compound include methylenediphenyl polyisocyanate and polymethylene polyphenyl polyisocyanate. Examples of the blocking agent include phenols such as phenol, thiophenol, chlorophenol, cresol, resorcinol, p-sec-butylphenol, p-tert-butylphenol, p-sec-amylphenol, p-octylphenol, p-nonylphenol; secondary or tertiary alcohols such as isopropyl alcohol, tert-butyl alcohol; aromatic secondary amine such as diphenylamine, xylidine; phthalic imide; lactam such as δ-valerolactam; caprolactam such as ε-caprolactam; active methylene compounds such as malonic acid dialkylester, acetylacetone, acetoacetic acid alkylester; oxime such as acetoxime, methylethylketoxime, cyclohexanoneoxime; basic nitrogen compounds such as 3-hydroxypyridine and acidic sodium sulfite. Examples of the amine-based curing agent include aliphatic amine, alicyclic amine and aromatic amine. In the present invention, when a (blocked) isocyanate compound and an amine-based curing agent are used in combination, it is preferable that the ratio of these used be in the range of a1:a2=0:30 to 30:1, where the mass of (blocked) isocyanate compound is a1 and the mass of amine-based curing agent is a2.

Examples of epoxy compound (B) used for the adhesive composition for organic fiber cords according to the present invention include reaction products of polyhydric alcohols such as diethylene glycol.diglycidyl ether, polyethylene glycol.diglycidyl ether, polypropylene glycol.diglycidyl ether, neopentylglycol.diglycidyl ether, 1,6-hexanediol.diglycidyl ether, glycerol.polyglycidyl ether, trimethylol propane.polyglycidyl ether, polyglycerol.polyglycidyl ether, pentaerythiol.polyglycidyl ether, diglycerol.polyglycidyl ether and sorbitol.polyglycidyl ether, and epichlorohydrin; novolac epoxy resins such as phenol novolac epoxy resins, cresol novolac epoxy resins; bisphenol A epoxy resin.

Examples of the rubber latex (C) used for the adhesive composition for organic fiber cords according to the present invention include vinylpyridine-styrene-butadiene copolymer latex, modified latex in which vinylpyridine-styrene-butadiene copolymer is modified with carboxyl group or the like, styrene-butadiene latex and modified latex thereof, natural rubber latex, acrylic acid ester copolymer latex, butyl rubber latex, chloroprene rubber latex, as well as, latex prepared by dispersing the same rubber ingredients as the rubber ingredients formulated in the covering rubber in water or organic solvent. Such rubber latex may be used alone or a plurality of these may be mixed to be used, and the rubber latex is preferably constituted of vinylpyridine-styrene-butadiene copolymer latex among others.

The above vinylpyridine-styrene-butadiene copolymer is formed by terpolymerizing a vinylpyridine compound, a styrene compound and a conjugated butadiene compound. Here, the vinylpyridine compound includes vinylpyridine and substituted vinylpyridine in which hydrogen atoms in the vinylpyridine are substituted with substituents. Examples of the vinylpyridine compound include 2-vinylpyridine, 3-vinylpyridine, 4-vinylpyridine, 2-methyl-5-vinylpyridine and 5-ethyl-2-vinylpyridine, and among these, 2-vinylpyridine is preferred. Such vinylpyridine compounds may be used alone or two or more of these may be used in combination.

The above styrene compound includes styrene and substituted styrene in which hydrogen atoms in the styrene are substituted with substituents. Examples of the styrene compound include styrene, α-methylstyrene, 2-methylstyrene, 3-methylstyrene, 4-methylstyrene, 2,4-diisopropylstyrene, 2,4-dimethylstyrene, 4-t-butylstyrene and hydroxymethylstyrene, and among these, styrene is preferred. Such styrene compounds may be used alone, or two or more of these may be used in combination.

Examples of the above conjugated butadiene compounds include aliphatic conjugated butadiene compounds such as 1,3-butadiene and 2-methyl-1,3-butadiene, and among these, 1,3-butadiene is preferred. Such conjugated butadiene compounds may be used alone, or two or more of these may be used in combination.

It is preferable that the vinylpyridine-styrene-butadiene copolymer latex used in the present invention is constituted of vinylpyridine-styrene-butadiene copolymer latex having a double structure which can be obtained by (i) polymerizing a monomer mixture having a styrene content of 30 to 60% by mass, a butadiene content of less than 60% by mass and a vinylpyridine content of 0.5 to 15% by mass, (ii) then, polymerizing a monomer mixture having a styrene content of 10 to 40% by mass, a butadiene content of 45 to 75% by mass and a vinylpyridine content of 5 to 20% by mass, at a lower styrene content than that used in the polymerization in (i). Examples of such vinylpyridine-styrene-butadiene copolymer latex include those described in Japanese Unexamined Patent Application Publication No. Hei 3-163181. By using such latex as describe above, the balance between the flexibility and the strength of the adhesive composition improves and also in an adhesive composition whose crosslink density is enhanced, the adhesive strength, particularly the heat-resistant adhesive strength in rubber can be improved. In the vinylpyridine-styrene-butadiene copolymer latex having the above double structure, when the styrene content in the inner layer is less than 30% by mass, the adhesive composition becomes flexible, the tensile strength decreases, the resistance against cohesive failure decreases and the adhesive strength decreases. On the other hand, when the styrene content in the inner layer is more than 60% by mass, the adhesive composition becomes hard and brittle, and the adhesive strength decreases. When the butadiene content in the inner layer is not less than 60% by mass, the adhesive composition becomes flexible, the tensile strength decreases, the resistance against cohesive failure decreases and the adhesive strength decreases. Further, when the vinylpyridine content in the inner layer is less than 0.5% by mass, the adhesive property between organic fiber cords and adhesive composition deteriorates, and on the other hand, the vinylpyridine content in the inner layer is more than 15% by mass, the adhesive composition becomes hard and brittle, and the adhesive strength decreases. In contrast to this, when the styrene content in the outer layer is less than 10% by mass, the adhesive composition becomes flexible, the tensile strength decreases, the resistance against cohesive failure decreases and the adhesive strength decreases. On the other hand, when the styrene content in the outer layer is more than 40% by mass, due to the decreased ability to form a film of the adhesive composition on the organic fiber cord, the adhesive strength decreases. The butadiene content of the outer layer is less than 45% by mass, the adhesive composition becomes hard and brittle, the adhesive strength decreases particularly at low temperature, and on the other hand, when the butadiene content of the outer layer is more than 75% by mass, the adhesive composition becomes flexible, the tensile strength decreases, the resistance against cohesive failure decreases and the adhesive strength decreases. Further, the vinylpyridine content in the outer layer is less than 5% by mass, the bonding strength of the rubber latex against the organic fiber cords decreases, and the adhesive property between organic fiber cords and adhesive composition deteriorates, and on the other hand, when the vinylpyridine content in the outer layer is more than 20% by mass, the vulcanization reaction of the latex is accelerated, which is not preferred.

In the adhesive composition for organic fiber cords according to the present invention, the ratio of the mass of the (blocked) isocyanate compound and/or amine curing agent (A) a to the mass of the epoxy compound (B) b (the mass of (blocked) isocyanate compound and/or amine curing agent/the mass of epoxy compound), a/b is preferably not smaller than 0.1 and not larger than 30, and more preferably not smaller than 0.1 and not larger than 10. When such a ratio a/b is smaller than 0.1, the effect of the (blocked) isocyanate compound and/or amine curing agent may not be sufficiently obtained and, on the other hand, when the ratio a/b is more than 30, the adsorption on the surface of the organic fiber cord of the epoxy compound becomes insufficient, and a sufficient adhesive strength may not be obtained, both of which are not preferred. When an amine-based curing agent is used, the blend ratio (molar ratio) of the active hydrogen that the amino group in the amine-based curing agent has to the epoxy group is preferably not more than 2.0. When the molar ratio is more than 2.0, a sufficient adhesive strength may not be obtained due to the effect of internal plasticizing of the epoxy compound, which is not preferred.

In the adhesive composition for organic fiber cords according to the present invention, the ratio of the total mass of the epoxy compound (B) and the (blocked) isocyanate compound and/or the amine-based curing agent (A) b+a to the mass of the rubber latex (C) c (the mass of epoxy compound+the mass of (blocked) isocyanate compound and/or amine curing agent)/the mass of rubber latex), (b+a)/c is preferably not smaller than 0.1 and not larger than 1.0. When the ratio (b+a)/c is less than 0.1, the heat curing of the adhesive composition becomes insufficient, the adhesive composition is easily adhered to a heat processing equipment and a stable heat processing cannot be conducted. On the other hand, when the ratio (b+a)/c is more than 1.0, due to the decrease in the emulsion stability of latex, the latex is precipitated from the adhesive solution, and thus, it becomes difficult to apply the adhesive composition evenly on the organic fiber cord.

The rubber reinforcing material according to the present invention constituted of organic fiber cords for tire reinforcement formed by twisting organic fibers and rubber which covers the organic fiber cords is constituted such that the organic fiber cord and the rubber are bonded by using the adhesive composition for organic fiber cords according to the present invention. Here, the material of the organic fiber cords is not particularly restricted, and a thermoplastic is preferred. Examples of the thermoplastics include polyamides, polyesters, polyolefins such as polypropylene and polyethylene, polycarbonates, polyacrylates, styrene resins such as ABS resins and vinyl chloride resins. Among these, polyester or nylon is preferred, and polyester which has a high mechanical strength, and is comparatively difficult to be bonded with rubber in a normal method, is particularly preferred.

On the other hand, rubber constituting the rubber reinforcing material according to the present invention is preferably those formed by adding compounding agents normally used in the rubber industry to rubber ingredients. Here, the rubber ingredients are not particularly restricted, and examples thereof include natural rubber as well as, polyisoprene rubber (IR), polybutadiene rubber (BR), styrene-butadiene copolymer rubber (SBR), acrylonitrile butadiene rubber (NBR), chloroprene rubber (CR), conjugated diene synthetic rubber such as butyl rubber (IIR), and further include ethylene-propylene copolymer rubber (EPM), ethylene-propylene-diene copolymer rubber (EPDM) and polysiloxane rubber. Among these, natural rubber and conjugated diene synthetic rubber are preferred. These rubber ingredients may be used alone, or two or more of these may be used in combination.

The vulcanization of the above rubber ingredients can be conducted by using as a vulcanizing agent, for example, sulfur, thiuram polysulfide compounds such as tetramethyl thiuram disulfide and dipentamethylene thiuram tetrasulfide, 4,4-dithiomorpholine, p-quinonedioxime, p,p'-dibenzo quinonedioxime, cyclic sulfur imide, peroxide, and the vulcanization is preferably conducted by using sulfur as a vulcanizing agent.

To the above rubber ingredients, a variety of compounding agents usually used in the rubber industry, such as fillers such as carbon black, silica, aluminium hydroxide, a vulcanizing accelerator, an aging inhibitor, a softener can be appropriately added. Further, the rubber reinforcing material according to the present invention may be a complex with particles, fibers, cloths made of a variety of materials.

The tire according to the present invention is characterized in that a rubber reinforcing material according to the present invention is used. Such a rubber reinforcing material is preferably used for a carcass or a belt reinforcing layer of a tire. Since a rubber article having a high durability is used for the tire according to the present invention, the tire has an excellent durability.

In the bonding method according to the present invention, an adhesive layer is formed by covering an organic fiber cord for tire reinforcement formed by twisting organic fibers with the adhesive composition for organic fiber cords according to the present invention, and the organic fiber cords and rubber are bonded via the adhesive composition for organic fiber cords.

With respect to the bonding method according to the present invention, examples of the method of forming an adhesive layer include immersing, brush coating, flow casting, spraying, roll coating and knife coating, and it is preferable that organic fiber cords are immersed in an adhesive composition for organic fiber cords to form an adhesive layer. In comparison with a two-step method in which an epoxy compound is adhered in the first step and a (blocked) isocyanate compound and rubber latex are adhered in the second step, an adhesive layer can be formed at lower cost by immersing because the immersing is a one-step method. Here, the thickness of the adhesive layer is preferably 0.5 to 50 μm, and more preferably 1 to 10 μm.

In the method of bonding according to the present invention, it is preferable that the adhesive layer be formed on the surface of the organic fiber cords, and then, the organic fiber cords be subjected to a drying process and a heating process, and further, the organic fiber cords be embedded in non-vulcanized rubber and the non-vulcanized rubber be subjected to a vulcanization process to bond the organic fiber cords and rubber via the adhesive composition for organic fiber cords. By this, the adhesive property can be improved.

EXAMPLES

The present invention will be described below more specifically by way of Examples.

Examples 1, 2 and Comparative Example 1

A polyester tire cord (made of polyester, 1670 dtex/2, count of twist: 39×39/10 cm: two polyester fibers of 1670 dtex were twisted at a count of twist of 39×39/10 cm) was prepared. Adhesives of Examples 1, 2 and Comparative Example 1 in the combinations shown in Table 1 below were manufactured, and aqueous adhesive solutions containing 20% by mass of the adhesives were prepared. The prepared tire cord was immersed in the aqueous adhesive solution and pulled up to adhere the aqueous adhesive solution to the tire cord.

The tire cord to which the aqueous adhesive solution was adhered was dried at 180° C., for 1 minute. Thereafter, by using a heat processing machine, the tire cord to which the adhesive was adhered was subjected to heating process in a state tensioned at 1 to 2 kg/cord at 240° C. for 2 minutes to manufacture a tire cord to which the adhesive was adhered. As a Conventional Example, a tire cord was manufactured by using a conventional resorcinol-formaldehyde-latex adhesive as an aqueous adhesive solution.

(Adhesive Property)

The adhesive strength of the obtained adhesive was evaluated according to JIS K6301. The adhesive strength was expressed by indices based on the adhesive strength according to the Conventional Example as 100. The higher value means the better result. The results are shown in Table 1 in combination.

TABLE 1

| | | Example 1 | Example 2 | Example 3 | Example 4 | Comparative Example 1 | Comparative Example 2 |
|---|---|---|---|---|---|---|---|
| Formulation (parts by mass) | (A1) Blocked isocyanate compound a1*[1] | 22 | 12.5 | 0 | 5 | 0 | 25 |
| | (A2) Amine-based curing agent a2*[2] | 0 | 0 | 8 | 2.5 | 0 | 0 |
| | (B) Epoxy compound b*[3] | 3 | 12.5 | 17 | 17.5 | 25 | 0 |
| | (C) Vinylpyridine-styrene-butadiene copolymer latex c*[4] | 100 | 100 | 100 | 100 | 100 | 100 |
| Formulation ratio | (a1 + a2)/b (Mass ratio) | 7.3 | 1.0 | 0.5 | 0.4 | 0.0 | — |
| | ((a1 + a2) + b)/c (Mass ratio) | 0.25 | 0.25 | 0.25 | 0.25 | 0.25 | 0.25 |
| | Active hydrogen equivalent/Epoxy group equivalent | — | — | 1.89 | 0.57 | — | — |
| (i) polymerization | Styrene content (% by mass) | 55 | 55 | 55 | 55 | 55 | 55 |
| | Butadiene content (% by mass) | 30 | 30 | 30 | 30 | 30 | 30 |
| | Vinylpyridine content (% by mass) | 15 | 15 | 15 | 15 | 15 | 15 |
| (ii) polymerization | Styrene content (% by mass) | 15 | 15 | 15 | 15 | 15 | 15 |
| | Butadiene content (% by mass) | 70 | 70 | 70 | 70 | 70 | 70 |
| | Vinylpyridine content (% by mass) | 15 | 15 | 15 | 15 | 15 | 15 |
| Evaluation | Adhesive property (Index) | 111 | 117 | 112 | 108 | 75 | 86 |

*[1] (blocked) isocyanate compound (manufactured by DAI-ICHI KOGYO SEIYAKU CO., LTD. "ELASTRON BN27", solid concentration 30%, thermal-reactive type aqueous urethane resin containing the molecular structure of methylenediphenyl)
*[2] amine-based curing agent (manufactured by Tokyo Chemical Industry Co., Ltd., piperazine (anhydride))
*[3] epoxy compound (manufactured by Nagase Kasei Kogyo KK, "Denacol-EX614B", sorbitol•polyglycidyl ether)
*[4] vinylpyridine-styrene-butadiene copolymer latex (Vp latex, solid concentration = 41% by mass, manufactured by Sumitomo A & L Co. Ltd., PYLATEX)

TABLE 2

|  |  | Example 5 | Example 6 | Example 7 | Example 8 | Example 9 |
|---|---|---|---|---|---|---|
| Formulation (parts by mass) | (A1) Blocked isocyanate compound a1*[1] | 85 | 24 | 52.5 | 110 | 75 |
|  | (A2) Amine-based curing agent a2*[2] | 0.7 | 0.3 | 10.5 | 0 | 5 |
|  | (B) Epoxy compound b*[3] | 3.0 | 0.7 | 42.0 | 3.0 | 7.5 |
|  | (C) Vinylpyridine-styrene-butadiene copolymer latex c*[4] | 100 | 100 | 100 | 100 | 100 |
| Formulation ratio | (a1 + a2)/b (Mass ratio) | 28.6 | 34.7 | 1.5 | 36.7 | 10.7 |
|  | (a1 + a2 + b)/c (Mass ratio) | 0.89 | 0.25 | 1.05 | 1.13 | 0.88 |
|  | Active hydrogen equivalent/Epoxy group equivalent | 0.94 | 1.72 | 1.00 | — | 2.68 |
| (i) polymerization | Styrene content (% by mass) | 55 | 55 | 55 | 55 | 55 |
|  | Butadiene content (% by mass) | 30 | 30 | 30 | 30 | 30 |
|  | Vinylpyridine content (% by mass) | 15 | 15 | 15 | 15 | 15 |
| (ii) polymerization | Styrene content (% by mass) | 15 | 15 | 15 | 15 | 15 |
|  | Butadiene content (% by mass) | 70 | 70 | 70 | 70 | 70 |
|  | Vinylpyridine content (% by mass) | 15 | 15 | 15 | 15 | 15 |
| Evaluation | Adhesive property (Index) | 115 | 108 | 110 | 111 | 107 |

TABLE 3

|  |  | Example 10 | Example 11 | Example 12 | Example 13 | Example 14 |
|---|---|---|---|---|---|---|
| Formulation (parts by mass) | (A1) Blocked isocyanate compound a1*[1] | 12.5 | 12.5 | 0 | 12.5 | 12.5 |
|  | (A2) Amine-based curing agent a2*[2] | 0 | 0 | 5 | 0 | 0 |
|  | (B) Epoxy compound b*[3] | 12.5 | 12.5 | 20 | 12.5 | 12.5 |
|  | (C) Vinylpyridine-styrene-butadiene copolymer latex c*[4] | 100 | 100 | 100 | 100 | 100 |
| Formulation ratio | (a1 + a2)/b (Mass ratio) | 1 | 1 | 1 | 1 | 1 |
|  | (a1 + a2 + b)/c (Mass ratio) | 0.25 | 0.25 | 0.25 | 0.25 | 0.25 |
|  | Active hydrogen equivalent/Epoxy group equivalent | — | — | 1.00 | — | — |
| (i) polymerization | Styrene content (% by mass) | 35 | 60 | 60 | 27.5 | 65 |
|  | Butadiene content (% by mass) | 55 | 30 | 25 | 57.5 | 30 |
|  | Vinylpyridine content (% by mass) | 10 | 10 | 15 | 15 | 5 |
| (ii) polymerization | Styrene content (% by mass) | 12.5 | 35 | 17.5 | 20 | 15 |
|  | Butadiene content (% by mass) | 70 | 50 | 65 | 60 | 75 |
|  | Vinylpyridine content (% by mass) | 17.5 | 15 | 17.5 | 20 | 10 |
| Evaluation | Adhesive property (Index) | 116 | 115 | 113 | 107 | 110 |

TABLE 4

|  |  | Example 15 | Example 16 | Example 17 | Example 18 | Example 19 |
|---|---|---|---|---|---|---|
| Formulation (parts by mass) | (A1) Blocked isocyanate compound a1*[1] | 12.5 | 12.5 | 12.5 | 12.5 | 12.5 |
|  | (A2) Amine-based curing agent a2*[2] | 0 | 0 | 0 | 0 | 0 |

TABLE 4-continued

|  |  | Example 15 | Example 16 | Example 17 | Example 18 | Example 19 |
|---|---|---|---|---|---|---|
|  | (B) Epoxy compound b*3) | 12.5 | 12.5 | 12.5 | 12.5 | 12.5 |
|  | (C) Vinylpyridine-styrene-butadiene copolymer latex c*4) | 100 | 100 | 100 | 100 | 100 |
| Formulation ratio | (a1 + a2)/b (Mass ratio) | 1 | 1 | 1 | 1 | 1 |
|  | (a1 + a2 + b)/c (Mass ratio) | 0.25 | 0.25 | 0.25 | 0.25 | 0.25 |
|  | Active hydrogen equivalent/ Epoxy group equivalent | — | — | — | — | — |
| (i) polymerization | Styrene content (% by mass) | 30 | 35 | 40 | 45 | 50 |
|  | Butadiene content (% by mass) | 65 | 45 | 45 | 40 | 37.5 |
|  | Vinylpyridine content (% by mass) | 5 | 20 | 15 | 15 | 12.5 |
| (ii) polymerization | Styrene content (% by mass) | 10 | 30 | 7.5 | 42.5 | 40 |
|  | Butadiene content (% by mass) | 75 | 65 | 75 | 50 | 47.5 |
|  | Vinylpyridine content (% by mass) | 15 | 5 | 17.5 | 7.5 | 12.5 |
| Evaluation | Adhesive property (Index) | 108 | 111 | 110 | 103 | 109 |

TABLE 5

|  |  | Example 20 | Example 21 | Example 22 |
|---|---|---|---|---|
| Formulation (parts by mass) | (A1) Blocked isocyanate compound a1*1) | 12.5 | 12.5 | 12.5 |
|  | (A2) Amine-based curing agent a2*2) | 0 | 0 | 0 |
|  | (B) Epoxy compound b*3) | 12.5 | 12.5 | 12.5 |
|  | (C) Vinylpyridine-styrene-butadiene copolymer latex c*4) | 100 | 100 | 100 |
| Formulation ratio | (a1 + a2)/b (Mass ratio) | 1 | 1 | 1 |
|  | (a1 + a2 + b)/c (Mass ratio) | 0.25 | 0.25 | 0.25 |
|  | Active hydrogen equivalent/ Epoxy group equivalent | — | — | — |
| (i) polymerization | Styrene content (% by mass) | 30 | 45 | 55 |
|  | Butadiene content (% by mass) | 60 | 45 | 30 |
|  | Vinylpyridine content (% by mass) | 10 | 10 | 15 |
| (ii) polymerization | Styrene content (% by mass) | 12.5 | 37.5 | — |
|  | Butadiene content (% by mass) | 77.5 | 40 | — |
|  | Vinylpyridine content (% by mass) | 10 | 22.5 | — |
| Evaluation | Adhesive property (Index) | 112 | 106 | 104 |

In Examples 1 to 20, by not using formaldehyde while blending, the release of formaldehyde into atmosphere can be eliminated, and the blending work environment can be improved. In the adhesive compositions in Examples 1 to 20, by using a composition which did not contain formaldehyde and resorcinol, the adhesive property between organic fiber cords and rubber can be secured. In contrast to this, since in Comparative Example 1 a (blocked) isocyanate compound is not contained, and in Comparative Example 2 epoxy compound is not contained, the adhesive strength thereof decreased respectively. In the Conventional Example, since formaldehyde and resorcinol are contained, the blending work environment was poor.

The invention claimed is:

1. A bonding method, wherein an adhesive layer is formed by covering an organic fiber cord for tire reinforcement formed by twisting organic fibers with an adhesive composition for organic fiber cords which contains either a (blocked) isocyanate compound or a (blocked) isocyanate compound and an amine-based curing agent (A), an epoxy compound (B) and rubber latex (C) without resorcinol and formaldehyde, and the organic fiber cords and rubber are bonded via the adhesive composition for organic fiber cords, wherein the ratio of the mass of the (blocked) isocyanate compound (A) a to the mass of the epoxy compound (B) b, a/b, is not smaller than 0.1 and not larger than 30, and wherein the rubber latex (C) is constituted of vinylpyridine-styrene-butadiene copolymer latex, which is constituted of vinylpyridine-styrene-butadiene copolymer latex having a double structure, which can be obtained by (i) polymerizing a monomer mixture having a styrene content of 30 to 60% by mass, a butadiene content of less than 60% by mass and a vinylpyridine content of 0.5 to 15% by mass, (ii) then, polymerizing a monomer mixture having a styrene content of 10 to 40% by mass, a butadiene content of 45 to 75% by mass and a vinylpyridine content of 5 to 20% by mass, at a lower styrene content than that used in the polymerization in the item (i).

2. The bonding method according to claim 1, wherein the organic fiber cords is immersed in the adhesive composition for organic fiber cords to form the adhesive layer.

3. The bonding method according to claim 1, wherein the adhesive layer is formed on the surface of the organic fiber cords, and then, the organic fiber cords are subjected to a drying process and a heating process, and further, the organic fiber cords are embedded in non-vulcanized rubber and the non-vulcanized rubber is subjected to a vulcanization process to bond the organic fiber cords and rubber via the adhesive composition for organic fiber cords.

4. The bonding method according to claim 1, wherein for the organic fiber cords, those constituted of polyester or nylon are used.

5. The bonding method according to claim 1, wherein the ratio of the total mass of the epoxy compound (B) and the (blocked) isocyanate compound (A) b+a to the mass of the rubber latex (C) c, (b+a)/c, is not smaller than 0.1 and not larger than 1.0.

6. The bonding method according to claim 1, wherein the ratio of the mass of the (blocked) isocyanate compound (A) a to the mass of the epoxy compound (B) b, a/b, is not smaller than 0.4 and not larger than 28.6.

7. The bonding method according to claim 1, wherein the ratio of the total mass of the epoxy compound (B) and the (blocked) isocyanate compound (A) b+a to the mass of the rubber latex (C) c, (b+a)/c, is not smaller than 0.1 and not larger than 0.25.

* * * * *